(12) United States Patent
Suga

(10) Patent No.: US 8,230,216 B2
(45) Date of Patent: Jul. 24, 2012

(54) INFORMATION PROCESSING APPARATUS, CONTROL METHOD THEREFOR, INFORMATION PROCESSING SYSTEM, AND PROGRAM

(75) Inventor: Yuji Suga, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 973 days.

(21) Appl. No.: 12/236,940

(22) Filed: Sep. 24, 2008

(65) Prior Publication Data

US 2009/0190189 A1 Jul. 30, 2009

(30) Foreign Application Priority Data

Oct. 1, 2007 (JP) ................................. 2007-258038

(51) Int. Cl.
G06F 21/00 (2006.01)
(52) U.S. Cl. ........................ 713/168; 713/170
(58) Field of Classification Search .................. 713/168, 713/170
See application file for complete search history.

(56) References Cited

U.S. PATENT DOCUMENTS

| | | | |
|---|---|---|---|
| 6,577,336 B2 * | 6/2003 | Safai | 348/207.1 |
| 6,889,324 B1 | 5/2005 | Kanai et al. | 713/176 |
| 6,968,058 B1 | 11/2005 | Kondoh et al. | 380/200 |
| 2004/0170277 A1 | 9/2004 | Iwamura et al. | |
| 2005/0166044 A1 | 7/2005 | Kanai et al. | 713/157 |
| 2005/0166057 A1 | 7/2005 | Kanai et al. | 713/176 |
| 2006/0149762 A1 | 7/2006 | Suga et al. | |
| 2007/0024698 A1 * | 2/2007 | Engstrom et al. | 348/14.01 |
| 2007/0058803 A1 | 3/2007 | Suga | |
| 2007/0136599 A1 | 6/2007 | Suga | |
| 2008/0031446 A1 | 2/2008 | Suga | |
| 2008/0152133 A1 | 6/2008 | Suga et al. | |

FOREIGN PATENT DOCUMENTS

| | | |
|---|---|---|
| JP | 11-164246 | 6/1999 |
| JP | 11-308564 | 11/1999 |
| JP | 2000-50193 | 2/2000 |
| JP | 2000-215379 | 8/2000 |
| JP | 2002-215029 | 7/2002 |

OTHER PUBLICATIONS

JEIDA standard JEIDA-49, Digital Still Camera Image File Format Standard (Exchangeable image file format for Digital Still Camera: Exif) Version 2.1.
R.L. Rivest, "A Method for Obtaining Digital Signatures and Public-Key Cryptosystems," Communications of ACM, v. 21, n.2 (1978), pp. 120-126.
ITU-T Recommendation X. 509/ISO/IEC9594-8: "Information technology-Open Systems Interconnection-The Directory: Public-key and attribute certificate frameworks".
NIST, FIPS Pub 198. Federal Information Processing Standards Publication. The Keyed-Hash Message Authentication Code. (HMAC).
NIST Special Publication 800-38B, Recommendation for Block Cipher Modes of Operation: The CMAC Mode for Authentication.

* cited by examiner

*Primary Examiner* — Benjamin Lanier
(74) *Attorney, Agent, or Firm* — Fitzpatrick, Cella, Harper & Scinto

(57) ABSTRACT

To authenticate an authentication reference apparatus, authentication information generation reference data is transmitted to the authentication reference apparatus. First authentication reference data generated by the authentication reference apparatus using the authentication information generation reference data is acquired from the authentication reference apparatus. Second authentication reference data is generated using key information complying with a method of generating the first authentication reference data and the authentication information generation reference data. The first authentication reference data is compared with the second authentication reference data. The authentication reference apparatus is authenticated based on the comparison result.

12 Claims, 6 Drawing Sheets

INFORMATION PROCESSING APPARATUS, CONTROL METHOD THEREFOR, INFORMATION PROCESSING SYSTEM, AND PROGRAM

BACKGROUND OF THE INVENTION

1. Field of the Invention

The present invention relates to an information processing system having an authentication reference apparatus which is captured together with an object and serves as a reference for authentication in order to assure the authenticity of an image obtained by capturing an object by an image capturing unit, and an information processing apparatus which authenticates the authentication reference apparatus.

2. Description of the Related Art

The electronic document law (to be referred to as the e-document law hereinafter) has been enforced which approves electronization of documents, forms, and the like that companies are obliged to preserve. The e-document law imposes roughly two requirements: (1) readability and (2) authenticity, in order to provide electronic documents with the same functions as those of paper documents.

As for readability, the operation of an application for reading an electronic document by the human eye via a device such as a PC needs to be assured for a period individually determined by law, together with concrete numerical targets of the resolution and the like. For example, according to the Japanese commercial law, this period is 10 years during which the company is obliged to preserve the minutes of a shareholders' meeting.

A concrete method of ensuring readability with respect to an original paper document assumes browsing via an output device such as a display. The ITC technique is introduced to add new functions of enlarging and confirming data for details, and searching for target data.

Authenticity guarantees the genuineness of an electronic document. A technique called a genuineness assurance system or digital data authenticity assurance system had conventionally been studied and developed before the e-document law was enacted. For example, a photograph recorded as analog data on a film by a silver halide camera is accepted as evidence in court proceedings and the like.

To the contrary, a digital camera which digitally processes captured data into digital data outputs image data as digital data, which can be readily modified and tampered with. For this reason, a mechanism is necessary to verify the genuineness of digital data, that is, whether image data generated by a digital camera has been modified.

For example, according to a conventional method disclosed in Japanese Patent Laid-Open No. 11-308564, a digest of image data captured by an image capturing unit is generated by a message digest generation unit using a hash function. The digest is encrypted using a private key incorporated in a digital camera, thereby creating MAC (Message Authentication Code). Details of the encryption process to generate a digest and MAC will be described later.

There are a variety of image data formats. When encoding a captured image, metadata other than the image data is generally stored at the header. For example, according to Exif (Exchangeable Image File Format) as a kind of image file format, various metadata such as the image capturing date & time, a device used to capture an image, and focus information are added to the header. The Exif is described in, for example, JEIDA standard JEIDA-49, Digital Still Camera Image File Format Standard (Exchangeable image file format for Digital Still Camera: Exif) Version 2.1.

For example, Japanese Patent Laid-Open No. 11-308564 proposes an image authenticity assurance system using an image file format having header information, like Exif. This system uses a MAC as data for assuring the authenticity of captured data at a later date. This system generates an authentication code which can be generated by only a device having key information because image data is encrypted using key information held by only an image capturing device. At this time, to perform matching of a MAC to captured data, the MAC is stored at the header of the image file format.

This system has been proposed to assure the authenticity of image data captured by a digital camera. Such image authenticity assurance systems are being widely applied to even personal uses, in addition to assuring the authenticity of documents in corporate environments, such as legal and public documents including the minutes of a general meeting the company is obliged to preserve.

For example, articles put up at an Internet auction are presented by images captured by an image capturing device such as a digital camera, in addition to text-based basic information such as the size, color, and material. Article images are important information which influences the bidding decisions and the contract price. However, a captured original image can be processed to hide any defect, for example, scratch or deterioration of the articles. This may cause a complaint from a successful bidder or a transaction trouble. To prevent this, even popular digital cameras require a mechanism for confirming the genuineness of article images.

Conventional techniques for ensuring image authenticity in order to assure the genuineness of an image, other than the data authenticity assurance function based on verification data such as MAC, will be introduced.

According to Japanese Patent Laid-Open No. 2002-215029, the date and time when an image was captured (or a paper document was scanned) can be specified later using a time stamp. According to Japanese Patent Laid-Open Nos. 2000-050193 and 2000-215379, the image capturing place can be specified later using GPS-based position information.

A cryptographic technique necessary to build an image authenticity assurance system will be explained.

[Hash Function]

The hash function will be explained. The hash function is used together with a digital signature process in order to lossily compress data to be signed and shorten the signature application time. More specifically, the hash function processes data M of an arbitrary length to generate output data of a predetermined length. The output H(M) is called hash data of plaintext data M.

In particular, a one-way hash function has a feature in which it is difficult in terms of the calculation amount to calculate plaintext M' which satisfies H(M')=H(M) for given data M. As the one-way hash function, there are standard algorithms such as MD2, MD5, and SHA-1.

[Public Key Cryptography]

The public key cryptography will be explained. The public key cryptography uses two different keys, and has a feature in which data encrypted by one key can be decrypted by only the other key. Of these two different keys, one is called a public key which is widely open to the public. The other key is called a private key which is held by only a user. According to this feature, a public key can be disclosed, so an encryption key need not be delivered in secret and can be easily delivered.

Encryption methods using the public key cryptography are, for example, RSA encryption and ElGamal encryption. The RSA encryption will be exemplified. The RSA encryption is described in, for example, R. L. Rivest, A. Shamir and L. Adleman: "A Method for Obtaining Digital Signatures and Public-Key Cryptosystems", Communications of the ACM, v. 21, n. 2, pp. 120-126, February 1978.

[RAS Encryption]

Prime numbers p and q are generated to make a number n=pq. λ(n) is defined as the least common multiple of p−1 and q−1. Appropriate e prime to λ(n) is selected to define d=1/e (mod λ(n)). e and n are set as public keys, and d is set as a private key.

[Creation of RSA Cipher Text] Procedure to create cipher text C of document M

C: $=M^e$(mod n) is defined as a cipher text.

[Decryption of RSA Cipher Text] Procedure to decrypt cipher text C

M: $=C^d$(mod n)

[Public Key Authentication Infrastructure]

User authentication is necessary to access a server resource in communication between a client and a server. As a means for the user authentication, a public key certificate such as ITU-U recommendation X.509 is popular. The public key certificate is data which assures the correspondence between a public key and a user, and has a digital signature attached by a trusted third party called a certification authority. For example, a user authentication method using SSL (Secure Sockets Layer) installed in a browser authenticates a user by confirming whether he has a private key corresponding to a public key included in a public key certificate presented by him.

Since the public key certificate is signed by a certification authority, the public keys of a user and server in the public key certificate can be trusted. For this reason, if a private key used to create a signature by a certification authority leaks or becomes vulnerable, all public key certificates issued by the certification authority become invalid. The certification authority manages an enormous number of public key certificates, and makes a variety of proposals to reduce the management cost. The present invention to be described later can suppress the number of certificates to be issued and reduce the access to a server serving as a public key repository.

ITU-U recommendation X.509 v.3 as an example of public key certificates contains the ID of an entity (Subject) to be certified and public key information as data to be signed. For a digest obtained by calculating the hash function for these data, signature data is generated by signature calculation such as an RSA algorithm. An optional field "extensions" is ensured in the data to be signed, and can hold new extension data specific to an application or protocol.

ITU-U recommendation X.509 v.3 is described in ITU-T Recommendation X.509/ISO/IEC 9594-8: "Information technology—Open Systems Interconnection—The Directory: Public-key and attribute certificate frameworks".

FIG. 6 shows the format of a public key certificate defined by X.509 v.3. Information displayed in each field will be explained.

The version of X.509 is set in a version 1501. This field is optional, and when omitted, it means v1. A serial number uniquely assigned by a certification authority is set in a serialNumber 1502. The signature method of a public key certificate is set in a signature 1503. The X.500 identification name of the certification authority serving as the issuer of the public key certificate is set in an issuer 1504. The valid term (start date & time and end date & time) of a public key is set in a validity 1505.

The X.500 identification name of the holder of a private key corresponding to the public key included in the certificate is set in a subject 1506. A certified public key is set in a subjectPublicKeyInfo 1507. An issuerUniqueIdentifier 1508 and subjectUniqueIdentifier 1509 are optional fields added from v2, and an identifier unique to the certification authority and that unique to the holder are set in the respective fields.

An extension 1510 is an optional field added by v3 and holds a set of three values: an extension type (extnId) 1511, critical bit (critical) 1512, and extension value (extnValue) 1513. The v3 extension field can store not only standard extension types defined by X.509, but also new unique extension types. Thus, how to recognize a v3 extension type depends on an application. The critical bit 1512 represents whether the extension type is indispensable or ignorable.

[Message Authentication Code (MAC)]

The digital signature is a message authentication method using public key cryptography to identify a user who has created a document. A message authentication method using secret key cryptography instead of public key cryptography or a hash function is also proposed and is called a message authentication code (MAC).

The message authentication method using a hash function will be explained. This hash function is described in, for example, NIST, FIPS PUB 198. FEDERAL INFORMATION PROCESSING STANDARDS PUBLICATION. The Keyed-Hash Message Authentication Code (HMAC).

H( ) is a hash function of a byte length B of a block and a byte length L of a hash output, and a private key K is made up of B bytes or less. Two different fixed character strings ipad and opad are defined as ipad=a character string obtained by repeating a byte value "0x36" 64 times, and opad=a character string obtained by repeating a byte value "0x5C" 64 times.

At this time, the MAC value of HMAC for D is calculated by H(K XOR opad||H(K XOR ipad||D)), where || represents the concatenation of data. HMAD uses the hash function to calculate a MAC value, but there is CMAC using secret key cryptography. The CMAC is described in, for example, NIST Special Publication 800-38B, Recommendation for Block Cipher Modes of Operation: The CMAC Mode for Authentication.

A large difference of the MAC from a digital signature is that a sender (MAC value creator) and a recipient (verifier) must share secret data (key K in the description of HMAC). The MAC has an advantage of a smaller calculation amount than that of the digital signature, but has a disadvantage because even the verifier holds secret data, so which of the sender and recipient has created MAC cannot be certified to a third party. The MAC is used together with a standard hash function such as SHA-1 in a network security protocol such as IPSec or SSL.

In paper document electronization applied in the e-document law and the like, readability and authenticity are requirements for electronization, as described above. The paper size of a printed material before electronically preserving the document does not matter.

However, the size of image-captured physical objects cannot be obtained from a digital image which is captured by an image capturing device such as a digital camera and is posted on a Web site such as an Internet auction or electronic mall. The size can be intentionally disguised. A conventional method for obtaining a relative size uses a reference medium whose size is generally recognized, such as a coin (e.g., a 1-yen coin), tobacco, lighter, or CD-ROM. However, these media serving as a reference to presume the size do not always have correct sizes. For example, the printout of a captured image may be captured again, or the output of an altered captured image on a display device may be captured again by an image capturing device. Further, the miniature of a car accident site, building, or the like may be created and captured. Such attacks which cheat a user as if a real thing existed are conceivable.

Even the data authenticity assurance function based on verification data such as MAC cannot avoid these attacks because image data is processed as an authentic one.

To solve this problem, Japanese Patent Laid-Open No. 11-164246 proposes a method of embedding distance information from an object in an image. However, when the source of "distance information from an object" is not specified, the distance information as metadata of the image can be readily forged and tampered with, failing to avoid the above-mentioned attacks. A covering attack which changes the color using cellophane on a lens accessory to an image capturing device can disguise color information.

As described above, even if the mechanism of assuring an image input from an image capturing device is reinforced, the original effects of the image authenticity assurance system cannot be attained as long as the input image itself is a fake.

SUMMARY OF THE INVENTION

The present invention has been made to overcome the conventional drawbacks, and has as its object to provide an information processing apparatus capable of enhancing the authenticity of an image obtained by capturing an object, a control method therefor, an information processing system, and a program.

According to one aspect of the present invention, an information processing apparatus which authenticates an authentication reference apparatus captured together with an object in order to assure authenticity of an image obtained by capturing the object by an image capturing unit, the apparatus comprises:

transmission means for transmitting authentication information generation reference data to the authentication reference apparatus in order to authenticate the authentication reference apparatus;

acquisition means for acquiring first authentication reference data from the authentication reference apparatus by capturing, by the image capturing unit, the first authentication reference data which is generated by the authentication reference apparatus using the authentication information generation reference data and displayed on a display unit of the authentication reference apparatus;

generation means for generating second authentication reference data by using (i) key information complying with a method of generating the first authentication reference data and (ii) the authentication information generation reference data;

comparison means for comparing the first authentication reference data with the second authentication reference data; and authentication means for authenticating the authentication reference apparatus on the basis of a comparison result of the comparison means.

Further features of the present invention will be apparent from the following description of exemplary embodiments with reference to the attached drawings.

DESCRIPTION OF THE EMBODIMENTS

Preferred embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

Outline of Overall System

Figure 1:
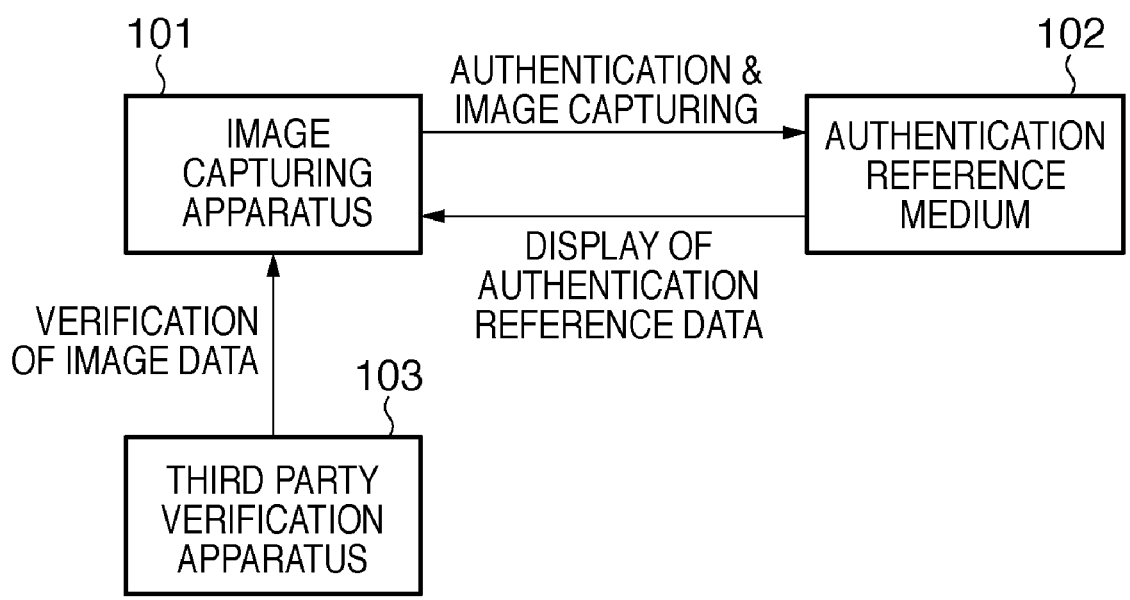
FIG. 1 is a block diagram showing the configuration of an information processing system according to the first embodiment of the present invention.

FIG. 1 is a block diagram showing the configuration of an information processing system according to the first embodiment of the present invention.

An image capturing apparatus 101 is an image capturing device such as a digital camera. In the first embodiment, the image capturing apparatus 101 is used together with an authentication reference medium 102 (authentication reference apparatus). To assure the genuineness (authenticity) of the size and color of an object, the authentication reference medium 102 is set in the image capturing range and captured by the image capturing apparatus 101. At this time, the image capturing apparatus 101 first authenticates the authentication reference medium 102, and then captures an image capturing target including authentication reference display data displayed on the authentication reference medium 102.

In this way, the authentication reference medium 102 is captured together with physical objects (image capturing target) whose size and color are to be assured. The rough size and color of the target can be obtained from authentication reference information such as the scale, color chart, and the like accessory to the authentication reference medium 102 itself. At this time, to assure that the authentication reference medium 102 is not a fake but has authentication reference information such as a correct scale and color chart, the image capturing apparatus 101 authenticates the authentication reference medium 102 before image capturing. The first embodiment provides a mechanism which allows a third party verification apparatus 103 to verify later image data captured by the image capturing apparatus 101.

The image capturing apparatus 101, authentication reference medium 102, and third party verification apparatus 103 comprise standard building components installed in a general-purpose computer. The standard building components include a CPU, RAM, ROM, hard disk, external storage device, network interface, display, keyboard, mouse, and the like.

[Explanation of Block Diagram]

The functional arrangements of the image capturing apparatus 101 and authentication reference medium 102 respectively functioning as information processing apparatuses will be explained with reference to FIG. 2.

Figure 2:
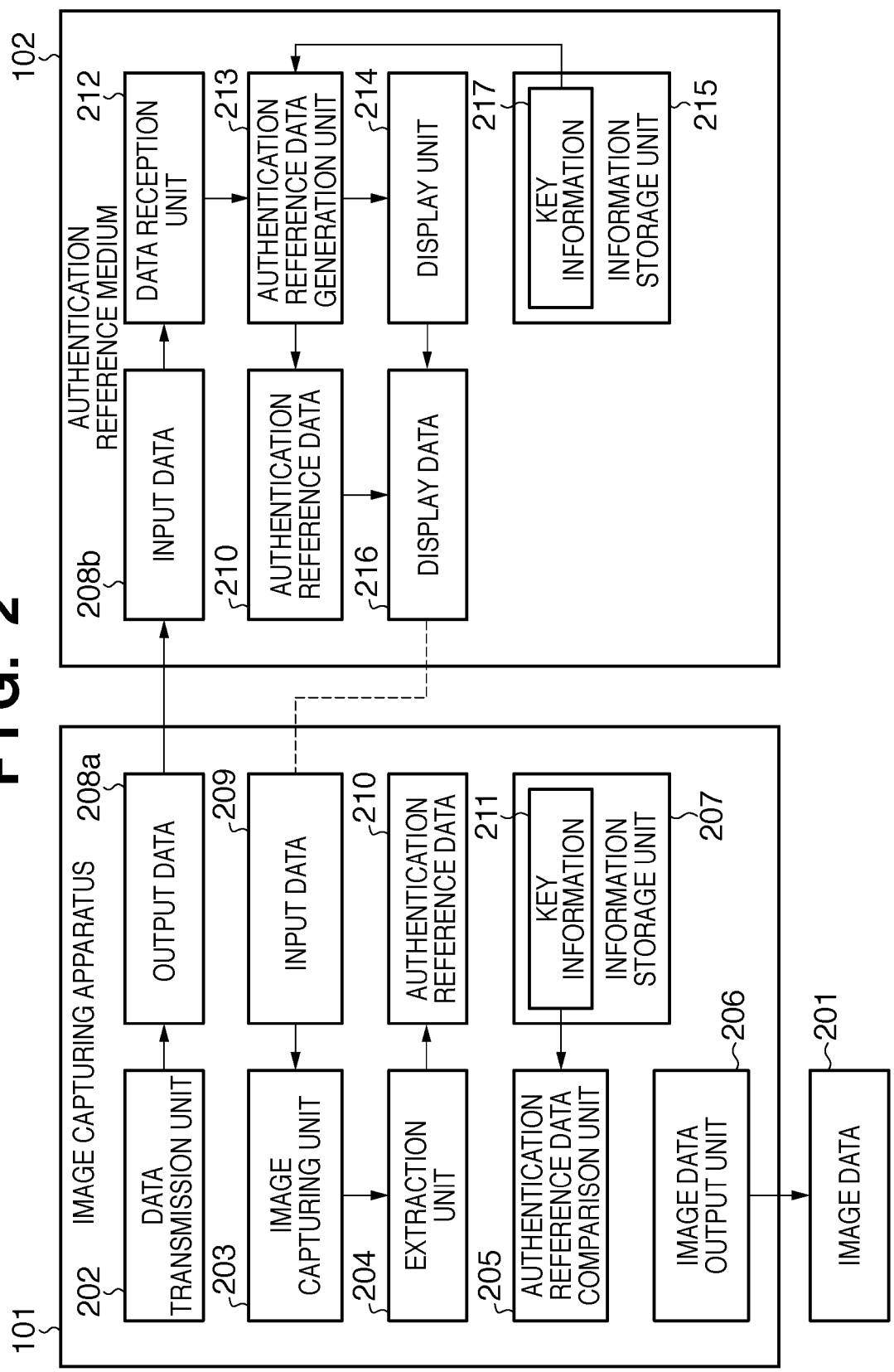
FIG. 2 is a block diagram showing the detailed arrangements of an image capturing apparatus and authentication reference medium according to the first embodiment of the present invention.

FIG. 2 is a block diagram showing the detailed arrangements of the image capturing apparatus and authentication reference medium according to the first embodiment of the present invention.

The image capturing apparatus 101 which outputs captured data as image data 201 comprises a data transmission unit 202, image capturing unit 203, extraction unit 204, authentication reference data comparison unit 205, image data output unit 206, and information storage unit 207.

First, the data transmission unit 202 and image capturing unit 203 will be described. Then, the extraction unit 204, authentication reference data comparison unit 205, image data output unit 206, and information storage unit 207 will be described in detail.

The data transmission unit 202 transmits output data 208a to the authentication reference medium 102. Transmission of data from the image capturing apparatus 101 to the authentication reference medium 102 can use not only wired communication such as a USB or Ethernet®, but also short distance wireless communication within a predetermined distance range such as Bluetooth or WiFi. When wireless communication is used, directional wireless communication is sometimes employed to check the presence of the authentication reference medium 102. At this time, whether the authentication reference medium 102 was set and captured at a correct position can be confirmed for a captured image in cooperation with a function of detecting the position of the authentication reference medium 102.

The image capturing unit 203 acquires the captured image as input data 209. At the timing when an image is captured, display data 216 needs to be output on a display unit 214 of the authentication reference medium 102. The output data 208a transmitted from the data transmission unit 202 triggers the output of the display data 216. Thus, the image capturing apparatus 101 requires a user interface to transmit the output data 208a.

For example, the data is transmitted when the user of the image capturing apparatus 101 performs a specific operation, for example, presses the shutter button of the image capturing apparatus 101 halfway. Alternatively, the data is transmitted in cooperation with the function of detecting the position of the authentication reference medium 102. It is also possible to always transmit output data at predetermined intervals regardless of a user operation. In any case, the time during which the display unit 214 outputs the display data 216 is as short an interval (designated time period) as several sec, and an image must be captured during this period. The authentication reference medium 102 sometimes has a function of ending the display on the display unit 214 upon receiving data representing the completion of image capturing from the image capturing apparatus 101.

The authentication reference medium 102 comprises a data reception unit 212, an authentication reference data generation unit 213, the display unit 214, and an information storage unit 215.

The data reception unit 212 receives the output data 208a as input data 208b. The authentication reference data generation unit 213 generates authentication reference data 210 on the basis of the input data 208b, and key information 217 stored in the information storage unit 215. The output data 208a (input data 208b) functions as authentication information generation reference data for generating the authentication reference data 210 (for authenticating the authentication reference medium 102 by the image capturing apparatus 101).

A method of generating the authentication reference data 210 by the authentication reference data generation unit 213 will be described.

In a challenge-response authentication method, the authentication reference data 210 corresponds to response data when the input data 208b serves as challenge data. More specifically, the image capturing apparatus 101 serving as an authenticator generates challenge data, and the authentication reference medium 102 serving as a verifier sends back response data. Then, the image capturing apparatus 101 authenticates the authentication reference medium 102.

In the first embodiment, the authentication algorithm used in the challenge-response authentication method is arbitrary. For example, (A-1) secret key cryptography AES-128, (A-2) hash function SHA-1, (A-3) keyed hash function HMAC-SHA1, and (A-4) public key cryptography RSA are employed. Methods of generating the input data 208b (output data 208a) and authentication reference data 210 in accordance with these authentication algorithms will be described.

(A-1) Case Using Secret Key Cryptography AES-128:

The data transmission unit 202 of the image capturing apparatus 101 generates 128-bit random data R (output data 208a), and sets it as the input data 208b to the authentication reference medium 102. E(K;R) generated using 128-bit key data K shared between key information 211 and the key information 217 is set as the authentication reference data 210. In this case, E(K;R) is data obtained by encrypting the random data R by ASE-128 using the key data K.

(A-2) Case Using Hash Function SHA-1:

The data transmission unit 202 of the image capturing apparatus 101 generates 160-bit random data R (output data 208a), and sets it as the input data 208b to the authentication reference medium 102. H(K∥R) generated using 160-bit key data K shared between the key information 211 and the key information 217 is set as the authentication reference data 210. In this case, H(X) is data obtained by calculating the hash function SHA-1 for data X. X∥Y represents concatenated data of data X and data Y.

(A-3) Case Using Keyed Hash Function HMAC-SHA1:

The data transmission unit 202 of the image capturing apparatus 101 generates 160-bit random data R (output data 208a), and sets it as the input data 208b to the authentication reference medium 102. H(K;R) generated using 160-bit key data K shared between the key information 211 and the key information 217 is set as the authentication reference data 210. In this case, H(K;R) is data obtained by encoding the random data R by HMAC-SHA1.

(A-4) Case Using Public Key Cryptography RSA (Key Length: 1,024 bits):

The data transmission unit 202 of the image capturing apparatus 101 generates 1,024-bit random data R (output data 208a), and sets it as the input data 208b to the authentication reference medium 102. $R^d$(mod n) is set as the authentication reference data 210 using an RSA private key d and public key n stored in the key information 217. In this case, n and e are RSA public keys with respect to the RSA private key d, and satisfy $(R^d)^e$=R(mod n).

Figure 6:
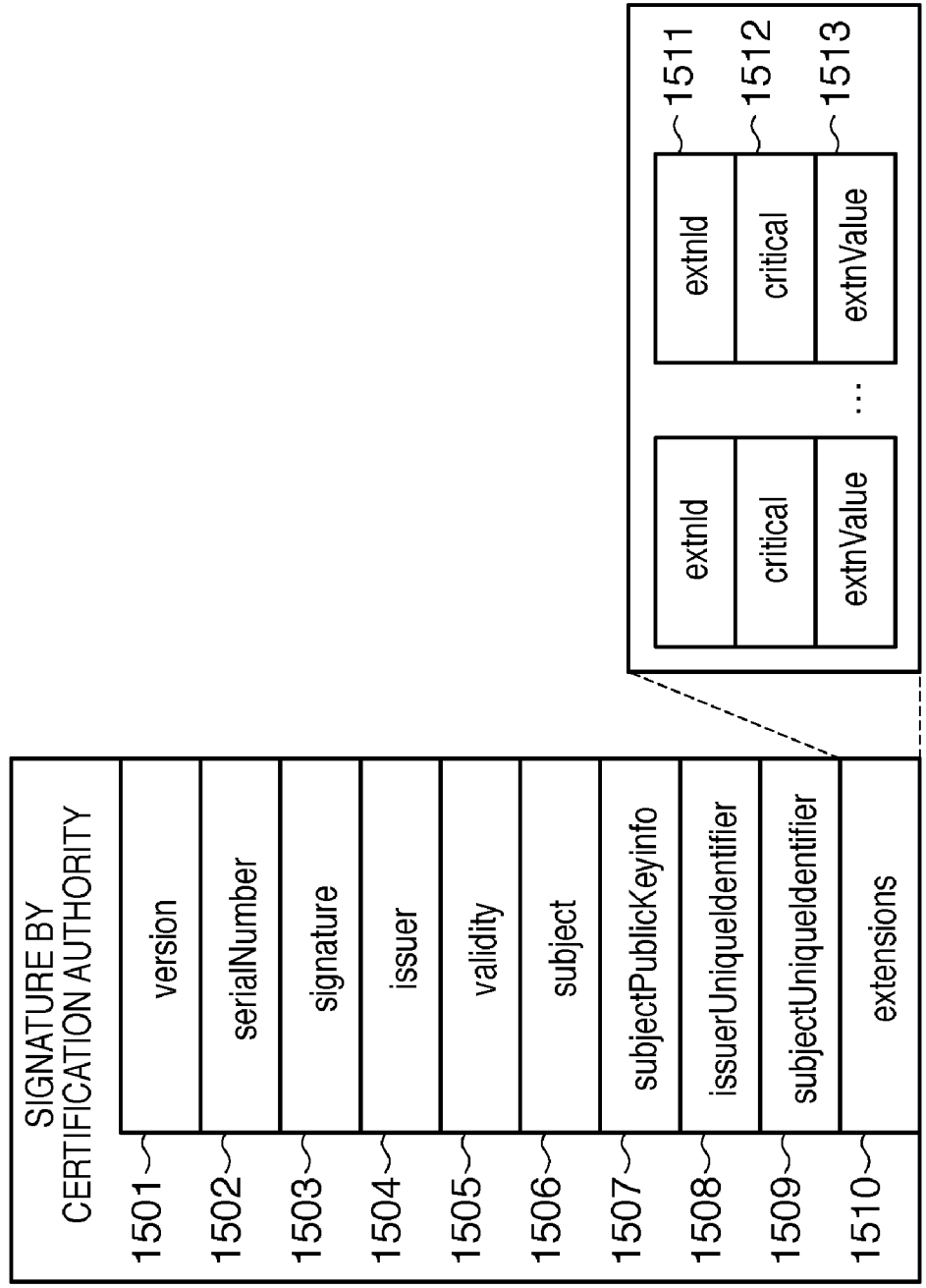
FIG. 6 is a view showing the format of a public key certificate defined by X.509 v.3.

It is also possible to attach, as the authentication reference data 210, a public key certificate including the RSA public keys n an e, an ID indicating the authentication reference medium 102, and the like, as shown in FIG. 6, or pointer information such as a URL for acquiring a certificate. The ID indicating the authentication reference medium 102 can be stored in one of a subject 1506, subject Unique Identifier 1509, and extension value (extnValue) 1513 in X.509 v.3.

The display unit 214 converts the generated authentication reference data 210 into display data, and outputs it as the display data 216. Display of the display data 216 on the display unit 214 assumes text display on a liquid crystal screen (liquid crystal display unit), flashing display by a plurality of LEDs (Light Emitting Diodes), or the like. However, the present invention is not limited to these display methods.

In the first embodiment, the authentication reference data 210 is displayed. However, when the image capturing apparatus 101 has speech input and speech recognition functions and the authentication reference medium 102 has a speech output function, the authentication reference data 210 can also be exchanged by voice.

The image capturing unit 203 captures an image capturing target and the authentication reference medium 102 including the display data 216, thereby obtaining the input data 209. However, the method is arbitrary as long as the authentication reference data 210 can be acquired visually or using the extraction unit 204. A method of displaying response data E(K;R) in (A-1) secret key cryptography AES-128 as the display data 216 on the display unit 214 will be exemplified.

When the display data 216 is displayed by text on a liquid crystal screen, the authentication reference data 210 is displayed on the display unit 214 as a 32-byte text by the hex representation (conversion of four bits into a 1-byte character), or as a 22-byte text by the base64 representation (conversion of six bits into a 1-byte character).

When the display data 216 is expressed using an LED, one LED represents one bit by the ON/OFF operation. When multiple colors can be expressed, $2^c$ bits (C is the number of colors) can be represented.

By expressing multiple colors using a plurality of LEDs, the authentication reference data 210 can be displayed on the display unit 214.

For example, 16 LED sets each including three primary colors (red, blue, and green) can be prepared to represent the response data E(K;R) in (A-1) secret key cryptography AES-128. If display of the authentication reference data 210 exceeds the display capability of the display unit 214, the authentication reference data 210 is divisionally displayed a plurality of number of times. In this case, the authentication reference data 210 can be extracted from a plurality of image data 201 obtained by sequentially capturing a plurality of images every time the authentication reference data 210 is displayed.

The extraction unit 204, authentication reference data comparison unit 205, image data output unit 206, and information storage unit 207 in the image capturing apparatus 101 will be explained.

The extraction unit 204 recognizes the display unit 214 of the authentication reference medium 102 from the input data 209 generated by the image capturing unit 203, and extracts the authentication reference data 210 from the display data 216 on the display unit 214. The authentication reference data comparison unit 205 compares the authentication reference data 210 with the key information 211 stored in the information storage unit 207, and checks whether challenge data has been generated correctly.

An authentication process by the extraction unit 204 and authentication reference data comparison unit 205 will be described with reference to FIG. 3.

Figure 3:
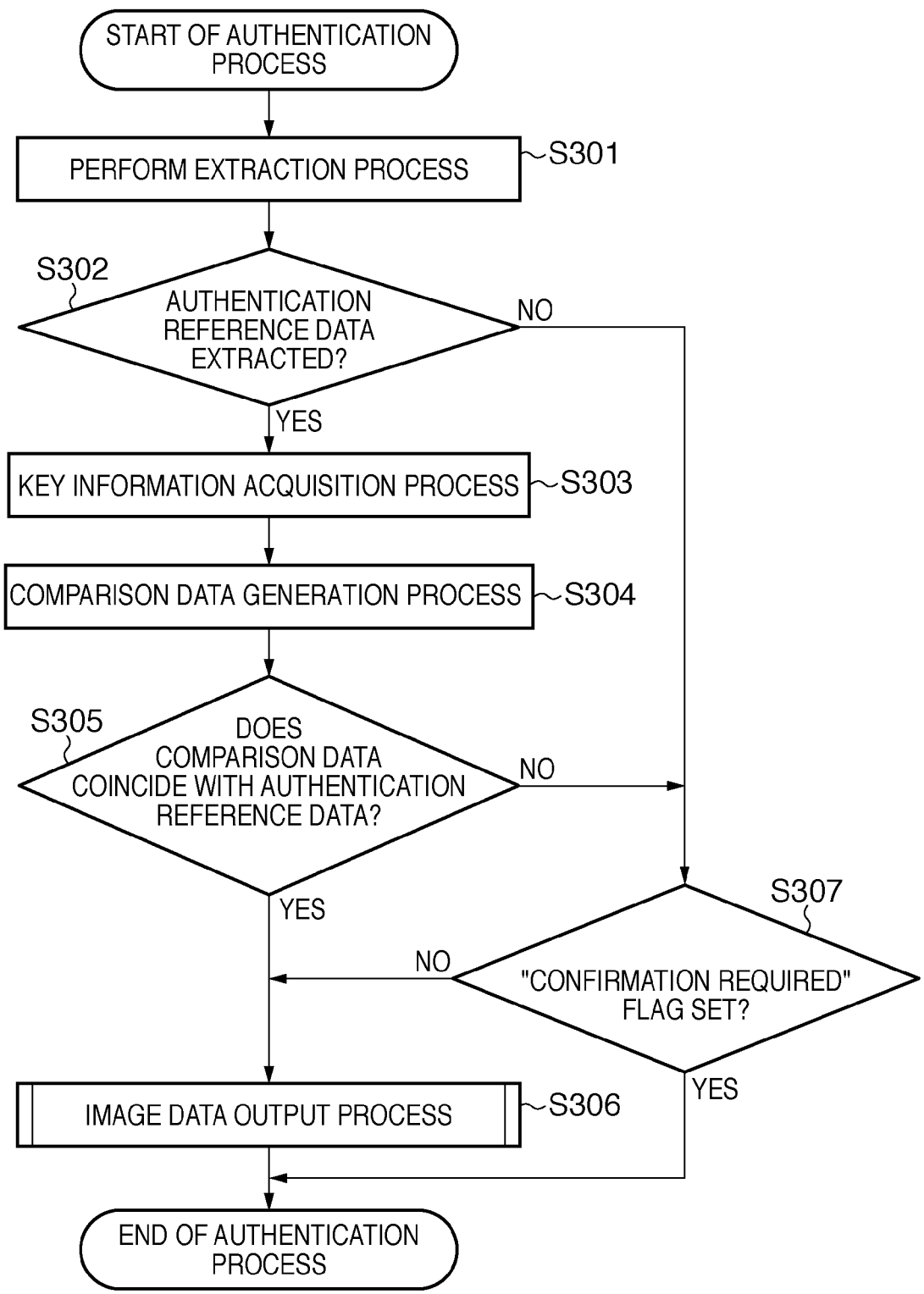
FIG. 3 is a flowchart showing an authentication process according to the first embodiment of the present invention.

FIG. 3 is a flowchart showing the authentication process according to the first embodiment of the present invention.

This authentication process is executed by implementing various building components shown in FIG. 2 by the CPU of the image capturing apparatus 101.

In step S301, the extraction unit 204 extracts the authentication reference data 210 from the input data 209. In step S302, the extraction unit 204 determines whether the authentication reference data 210 has been extracted. If the extraction unit 204 determines that the authentication reference data 210 has been extracted (YES in step S302), the process advances to step S303. If the extraction unit 204 determines that the authentication reference data 210 has not been extracted because, for example, the authentication reference medium 102 could not be recognized (NO in step S302), the process advances to step S307.

The first embodiment assumes that, even if the authentication reference data 210 cannot be extracted or erroneous data is extracted, authentication is possible by extracting the authentication reference data 210 later visually or by another extraction algorithm. Thus, in the first embodiment, a flag (setting information) is added to the input data 209 to represent whether authentication needs to be confirmed later. The contents of the process are changed based on the flag representing whether the confirmation is required. In other words, whether to continue the process is determined based on this flag (setting information).

In order to determine whether the confirmation is required, the extraction unit 204 determines in step S307 whether the flag is set as a "confirmation required" flag. If the extraction unit 204 determines that the "confirmation required" flag is set (YES in step S307), the process ends in an error process.

If the extraction unit 204 determines that no "confirmation required" flag is set (NO in step S307), the process advances to step S306 as a normal process even when the authentication reference data 210 has not been extracted or authentication has failed.

In this case, the process of step S306 is executed as a case where the authentication reference medium 102 need not be authenticated.

A process when it is determined in step S302 that the authentication reference data 210 has been extracted will be explained.

In step S303, the authentication reference data comparison unit 205 acquires the key information 211 corresponding to the output data 208a from the information storage unit 207. If the authentication reference data comparison unit 205 has failed to acquire the key information 211, the process advances to step S307.

At this time, the key information 211 complying with the method of generating the authentication reference data 210 by the authentication reference data generation unit 213 needs to be acquired. Particularly when authentication is done using a shared key as represented by (A-1), (A-2), and (A-3), and the same key information as the key information 217 used to generate the authentication reference data 210 is required, the key information 217 needs to be set in the key information 211 in advance. The key information 211 can hold not only a shared key for a specific authentication reference medium 102, but also different shared keys for respective authentication reference media.

If a key (public key) different from key information (private key) used to generate the authentication reference data 210 needs to be held in verification, like (A-4), the public key needs to be acquired. When key information or pointer information of the key information is attached to the authentication reference data 210, it is used. Alternatively, a public key or public key certificate may also be set in advance.

In step S304, the authentication reference data comparison unit 205 generates the second authentication reference data from the key information 211 and input data 209 according to the method of generating the authentication reference data 210 (first authentication reference data) by the authentication reference data generation unit 213. The authentication reference data comparison unit 205 compares the generated second authentication reference data with the authentication reference data 210.

In step S305, it is determined based on the comparison result whether the second authentication reference data coincides with the authentication reference data 210 (first authentication reference data). If it is determined that these authentication reference data coincide with each other (YES in step S305), that is, the authentication is successful, the process advances to step S306. If it is determined that these authentication reference data do not coincide with each other (NO in step S305), or key information necessary for verification has not been acquired in step S302, that is, the authentication fails, the process advances to step S307.

In this case, output of image data from the image data output unit 206 may also be inhibited without advancing to step S307. It is also possible to display, on the display unit (e.g., a liquid crystal display) of the image capturing apparatus 101, a notification window notifies the failure in authentication and includes an instruction to capture an image again. A warning window representing inhibition of output may also be displayed on the display unit.

In step S306, the image data output unit 206 outputs image data including various kinds of information used in the authentication process.

Details of the image data output process in step S306 by the image data output unit 206 will be explained with reference to FIG. 4.

Figure 4:
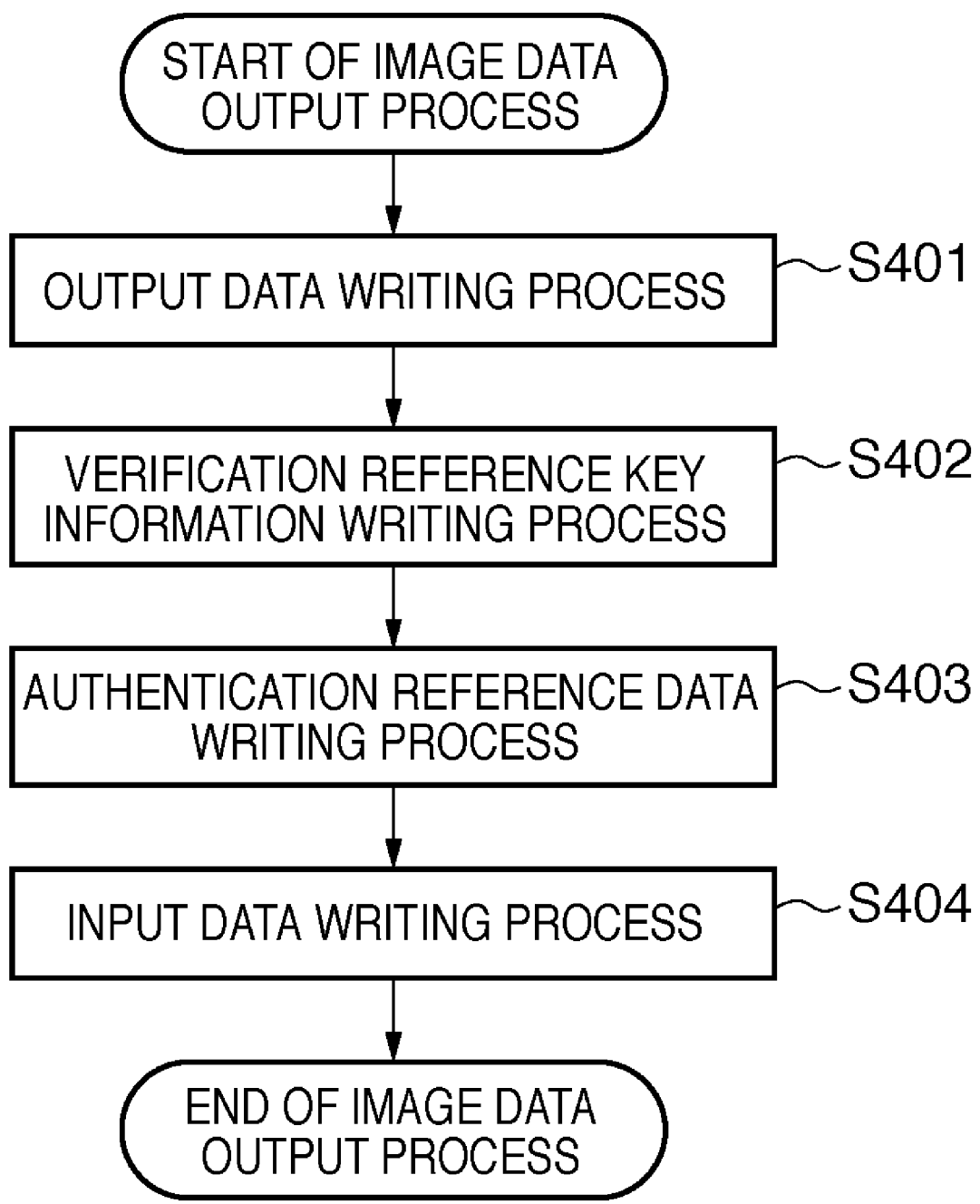
FIG. 4 is a flowchart showing details of step S306 by an image data output unit according to the first embodiment of the present invention.

FIG. 4 is a flowchart showing details of step S306 by the image data output unit according to the first embodiment of the present invention.

In step S401, the image data output unit 206 writes the output data 208a serving as challenge data. In step S402, which is an optional step, the image data output unit 206 writes verification reference key information (or pointer information of the verification reference key information). Particularly in an authentication method using public key cryptography, like (A-4), the image data output unit 206 stores a public key.

In step S403, which is an optional step, the image data output unit 206 writes the extracted authentication reference data 210. The write process in steps S401 to S403 is the same as a process in an image authenticity assurance system using a message authentication code described in Description of the Related Art. That is, the output data 208a, verification reference key information, and authentication reference data 210 can be stored at the header of the image format of the image data 201. In other words, the output data 208a, verification reference key information, and authentication reference data 210 can be added to the image data 201.

Finally in step S404, the image data output unit 206 writes the input data 209 at the header of the image format of the image data 201. Alternatively, the image data output unit 206 may also embed the input data 209 in the body of the image data 201 by using digital watermark technique and etc. Note that the key information 211 needs to be handled as private key information when performing authentication using a shared key in the above-described process, like (A-1), (A-2), and (A-3). For this purpose, a tamper-resistant medium may also be used.

[Verification Method by Third Party Verification Apparatus]

A verification method by the third party verification apparatus 103 will be explained.

Figure 5:
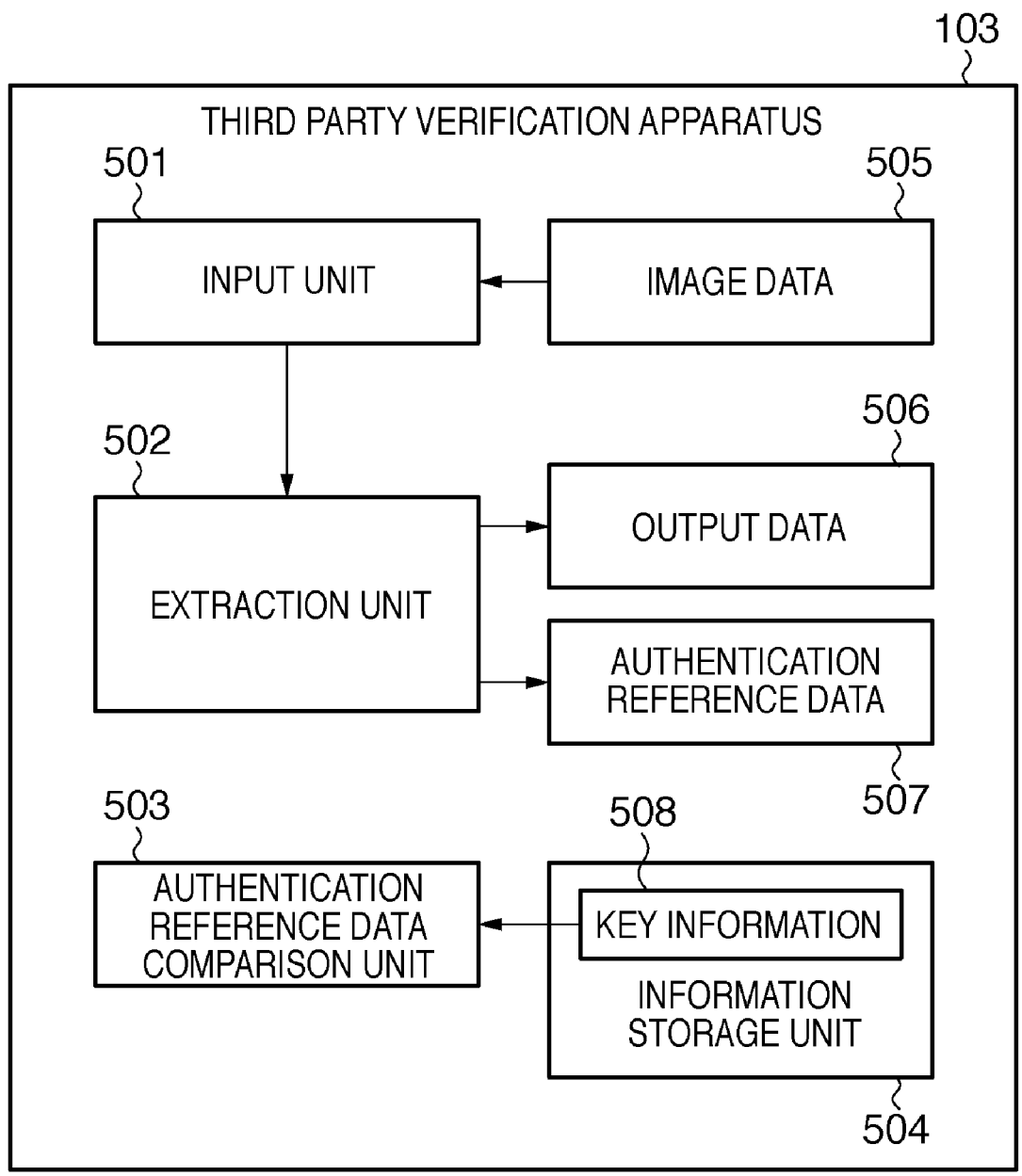
FIG. 5 is a block diagram showing the detailed arrangement of a third party verification apparatus according to the first embodiment of the present invention.

FIG. 5 is a block diagram showing the detailed arrangement of the third party verification apparatus according to the first embodiment of the present invention.

The third party verification apparatus 103 serving as an information processing apparatus has almost the same arrangement as that of the image capturing apparatus 101. The third party verification apparatus 103 comprises an input unit 501, extraction unit 502, authentication reference data comparison unit 503, and information storage unit 504. The extraction unit 502 corresponds to the extraction unit 204, the authentication reference data comparison unit 503 corresponds to the authentication reference data comparison unit 205, and the information storage unit 504 corresponds to the information storage unit 207. The image capturing apparatus 101 can also function as the third party verification apparatus 103.

The input unit 501 receives image data 505 serving as, for example, the image data 201 of the image capturing apparatus 101. The extraction unit 502 extracts output data 506 and authentication reference data 507 from the image data 505. At this time, the authentication reference data 507 is held in the header or body of the image data 505. When the authentication reference data 507 is acquired from both the header and body, it is checked whether the two data coincide with each other.

The authentication reference data comparison unit 503 compares data. However, this process is the same as that of the authentication reference data comparison unit 205, and a description thereof will not be repeated. At this time, the authentication reference data comparison unit 503 needs to acquire key information 508 from the information storage unit 504. Particularly when authentication is performed using a shared key as represented by (A-1), (A-2), and (A-3), the same key needs to be shared in the third party verification apparatus 103 serving as an image genuineness verification apparatus. In this case, the key can be carried using a medium or device such as a portable USB key which stores key information in secret (e.g., a USB dongle having a tamper-resistant data area).

[Summary of Requirements]

Requirements which should be satisfied by the image authenticity assurance system in the first embodiment will be considered. It sometimes cannot be confirmed whether response data has come from an authentication reference medium included in an object (image capturing target). In this case, the response data may not have come from an authentic authentication reference medium which sends back response data, but may have come from an attack which captures an object including an authentication reference medium forged as a fake. At this time, if the forged authentication reference medium is created using a scale and color scale different from those of an authentic size authentication reference medium and color authentication reference medium, "assurance of a relative size and color", which is a requirement to be achieved in the present invention, cannot be attained.

Hence, response data needs to be transmitted using a communication channel different from one for transmitting challenge data from the image capturing apparatus to the authentication reference medium. The present invention ensures the response data transmission channel by capturing response data visualized at the same time as a target subjected to size authentication. This method has advantages capable of easily linking response data and a target subjected to size authentication without using another special arrangement, and ensuring high security of the linkage.

As described above, according to the first embodiment, an authentication reference apparatus captured together with an object is authenticated to assure the authenticity of an image obtained by capturing the object. If the authentication is successful, various kinds of information used in the authentication are output by adding them to image data of the captured image of the object. This enables subsequent verification while assuring the authenticity of image data.

The first embodiment can be adopted together with a conventional technique of assuring the genuineness of image data. By applying both the first embodiment and conventional technique, the authenticity of an image can be further enhanced.

Second Embodiment

The first embodiment employs a 2-way challenge-response authentication method as a method of performing authentication between the image capturing apparatus 101 and the authentication reference medium 102, but the authentication method is not limited to this. The second embodiment will describe an authentication method when an image capturing apparatus 101 and authentication reference medium 102 can communicate with each other not in one way but in two ways.

The second embodiment employs a 4-way protocol. Two ways of the first half are used to exchange information for authenticating the authentication reference medium 102 by the image capturing apparatus 101. Two ways of the second half are used to exchange information for assuring the authenticity of an image. The two ways of the second half are the same as the protocol described in the first embodiment, and a description thereof will not be repeated.

The two ways of the first half are communication channels established between a data transmission unit 202 and a data reception unit 212, and the same challenge-response authentication as that in the first embodiment is executed. At this time, a shared key and algorithm different from those for the two ways of the second half may also be used. As accessory information, the authentication reference medium 102 transmits information including time information and position information to the image capturing apparatus 101 in order to more reliably ensure the genuineness of an image by combining the authentication reference medium 102. This is because the image capturing apparatus 101 does not have a function of acquiring correct time information using a function such as a NTP or time stamp server, or correct position information obtained by a GPS. If the image capturing apparatus 101 has such a function, the function can also be used to check whether pieces of information coincide with each other.

As described above, in addition to the effects described in the first embodiment, the second embodiment can further enhance the authenticity of an image by using a challenge-response authentication method by two-way communication.

Third Embodiment

The first and second embodiments have described the configuration for assuring the genuineness of the authentication reference medium 102. In the third embodiment, the manufacturer guarantees that an authentication reference medium 102 has correct scales for the size, color, and the like, thereby assuring the genuineness of the size and color information of an image capturing target. In this case, authentication reference data 210 contains information on the size (height× width×depth) of the housing of the authentication reference medium 102, and the color of the housing. A scale or color chart may also be attached to the surface of the housing.

That is, when the authentication reference medium 102 is used for size authentication, a rough size of an object can be obtained by comparing the relative sizes of the object and the authentication reference medium 102. When the authentication reference medium has color information such as a color chart, a rough color of the object can be assured. In this fashion, the third embodiment can achieve size authentication and color authentication without particularly changing the authentication protocol.

Fourth Embodiment

The first to third embodiments assume that captured data is processed as digital data. However, these embodiments are also applicable to even image capturing on a general film by a silver halide camera or the like. That is, the embodiments are not limited to a digital camera which digitally processes captured data into digital data, but are also applicable to a conventional silver halide camera by arranging a data transmission unit and transcribing a captured image on a film.

At this time, output data displayed on an authentication reference medium serving as part of an object is detected from captured data transcribed on the film. Authentication reference data 210 is extracted based on digital image data from the film visually or using a third party verification apparatus 103. As a result, the fourth embodiment can attain the same effects as those described in the first to third embodiments.

Fifth Embodiment

The first to third embodiments have exemplified an information processing system in which the authentication reference medium 102 (e.g., a computer) and the image capturing apparatus 101 (e.g., a digital camera) are connected to each other. However, the present invention is not limited to this. The present invention is easily applicable to an information processing system in which a plurality of arbitrary information processing devices such as a computer, printer, digital camera, scanner, video game machine, portable information terminal, and cell phone are connected to each other.

The present invention is similarly applicable to an information processing system in which a plurality of information processing devices of the same type such as computers are connected to each other. Even when the authentication method uses another encryption algorithm, the configurations according to the above-described embodiments are applicable.

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or script data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-258038, filed Oct. 1, 2007, which is hereby incorporated by reference herein in its entirety.

What is claimed is:

1. An information processing apparatus which authenticates an authentication reference apparatus captured together with an object in order to assure authenticity of an image obtained by capturing the object by an image capturing unit, the apparatus comprising:
  a central processing unit programmed to perform the functions of
    a transmission unit that transmits authentication information generation reference data to the authentication reference apparatus in order to authenticate the authentication reference apparatus;
    an acquisition unit that acquires acquiring first authentication reference data from the authentication reference apparatus by capturing, by the image capturing unit, the first authentication reference data which is generated by the authentication reference apparatus using the authentication information generation reference data and displayed on a display unit of the authentication reference apparatus;
    a generation unit that generates second authentication reference data by using (i) key information complying with a method of generating the first authentication reference data and (ii) the authentication information generation reference data;
    a comparison unit that compares the first authentication reference data with the second authentication reference data; and
    an authentication unit that authenticates the authentication reference apparatus on the basis of a comparison result of said comparison unit.

2. The apparatus according to claim 1, wherein said acquisition unit comprises
  a recognition unit that recognizes a captured image obtained by capturing, by the image capturing unit, the authentication reference apparatus which displays the first authentication reference data on the display unit, and
  an extraction unit that extracts the first authentication reference data from the image recognized by said recognition unit.

3. The apparatus according to claim 2, further comprising a determination unit that, when said extraction unit fails to extract the first authentication reference data, determines, based on setting information included in the captured image, whether to continue a process.

4. The apparatus according to claim 1, further comprising output unit for, when authentication by said authentication unit is successful, outputting data obtained by adding the authentication information generation reference data, the key information, and the first authentication reference data to image data of a captured image obtained by capturing the authentication reference apparatus together with the object by the image capturing unit.

5. The apparatus according to claim 2, wherein said acquisition unit comprises
  a recognition unit for recognizing a plurality of captured images obtained by capturing, a plurality of number of times by the image capturing unit, the authentication reference apparatus which divisionally displays the first authentication reference data a plurality of number of times on the display unit, and
  an extraction unit for extracting the first authentication reference data from the plurality of images recognized by said recognition unit.

6. An information processing apparatus which verifies authenticity of image data output from the information processing apparatus defined in claim 4, the apparatus comprising:
  an extraction unit that extracts the authentication information generation reference data and the first authentication reference data from the image data;
  a generation unit that generates second authentication reference data by using (i) key information complying with a method of generating the first authentication reference data and (ii) the authentication information generation reference data;
  a comparison unit that compares the first authentication reference data with the second authentication reference data; and
  a verification unit that verifies the authenticity of the image data on the basis of a comparison result of said comparison unit.

7. An information processing system comprising an authentication reference apparatus captured together with an object in order to assure authenticity of an image obtained by capturing the object by an image capturing unit, and an information processing apparatus which authenticates said authentication reference apparatus, said information processing apparatus comprising:
- a central processing unit programmed to perform the functions of
  - a transmission unit that transmits authentication information generation reference data to said authentication reference apparatus in order to authenticate said authentication reference apparatus;
  - an acquisition unit that acquires first authentication reference data from said authentication reference apparatus by capturing the first authentication reference data which is generated by said authentication reference apparatus using the authentication information generation reference data and displayed on a display unit of said authentication reference apparatus;
  - a first generation unit that generates second authentication reference data by using (i) key information complying with a method of generating the first authentication reference data and (ii) the authentication information generation reference data;
  - a comparison unit that compares the first authentication reference data with the second authentication reference data; and
  - an authentication unit that authenticates said authentication reference apparatus on the basis of a comparison result of said comparison unit, and said authentication reference apparatus comprising:
- a central processing unit programmed to perform the functions of
  - a reception unit that receives the authentication information generation reference data from said information processing apparatus;
  - a second generation unit that generates the first authentication reference data by using the authentication information generation reference data received by said reception unit; and
  - a display that displays the first authentication reference data to be captured by said information processing apparatus during a designated time period.

8. A method of controlling an information processing apparatus which authenticates an authentication reference apparatus captured together with an object in order to assure authenticity of an image obtained by capturing the object by an image capturing unit, the method comprising:
- a transmission step of transmitting authentication information generation reference data to the authentication reference apparatus in order to authenticate the authentication reference apparatus;
- an acquisition step of acquiring first authentication reference data from the authentication reference apparatus by capturing the first authentication reference data which is generated by the authentication reference apparatus using the authentication information generation reference data and displayed on a display unit of the authentication reference apparatus;
- a generation step of generating second authentication reference data by using (i) key information complying with a method of generating the first authentication reference data and (ii) the authentication information generation reference data;
- a comparison step of comparing the first authentication reference data with the second authentication reference data; and
- an authentication step of authenticating the authentication reference apparatus on the basis of a comparison result in the comparison step.

9. The method according to claim 8, wherein the acquisition step comprises
- a recognition step of recognizing a captured image obtained by capturing the authentication reference apparatus which displays the first authentication reference data on the display unit, and
- an extraction step of extracting the first authentication reference data from the image recognized in the recognition step.

10. The method according to claim 9, further comprising a determination step of, when extraction of the first authentication reference data fails in the extraction step, determining, based on setting information included in the captured image, whether to continue a process.

11. The method according to claim 8, further comprising an output step of, when authentication in the authentication step is successful, outputting data obtained by adding the authentication information generation reference data, the key information, and the first authentication reference data to image data of a captured image obtained by capturing the authentication reference apparatus together with the object.

12. A non-transitory computer readable medium storing a program for causing a computer to control an information processing apparatus which authenticates an authentication reference apparatus captured together with an object in order to assure authenticity of an image obtained by capturing the object by an image capturing unit, the program causing the computer to execute
- a transmission step of transmitting authentication information generation reference data to the authentication reference apparatus in order to authenticate the authentication reference apparatus,
- an acquisition step of acquiring, from the authentication reference apparatus, first authentication reference data which is generated by the authentication reference apparatus using the authentication information generation reference data and displayed on a display unit of the authentication reference apparatus,
- a generation step of generating second authentication reference data by using (i) key information complying with a method of generating the first authentication reference data and (ii) the authentication information generation reference data,
- a comparison step of comparing the first authentication reference data with the second authentication reference data, and
- an authentication step of authenticating the authentication reference apparatus on the basis of a comparison result in the comparison step.

* * * * *